(No Model.) 2 Sheets—Sheet 2.
W. N. MOORE.
HEATING STOVE.
No. 499,306. Patented June 13, 1893.
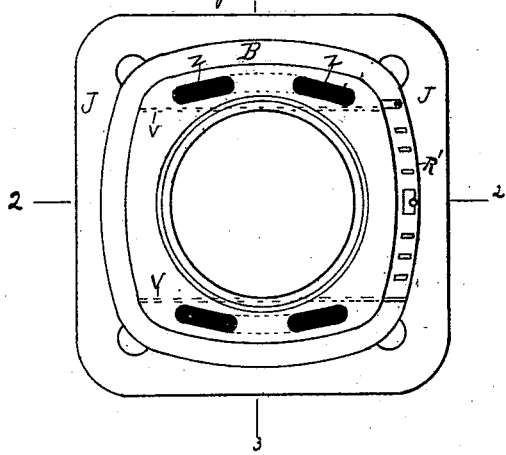
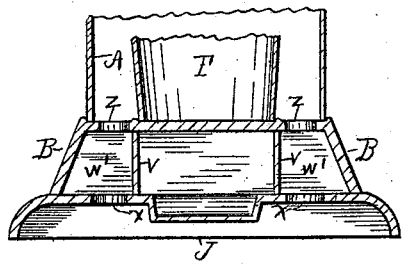
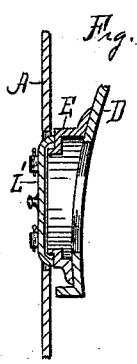
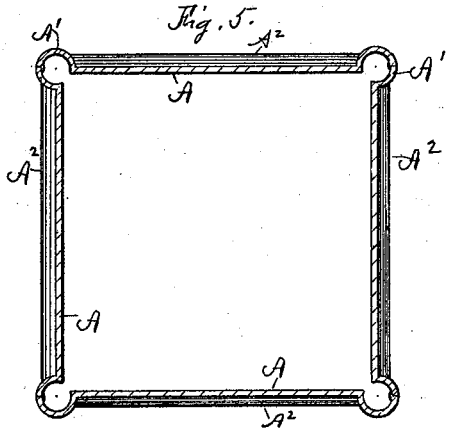
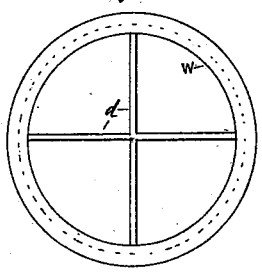
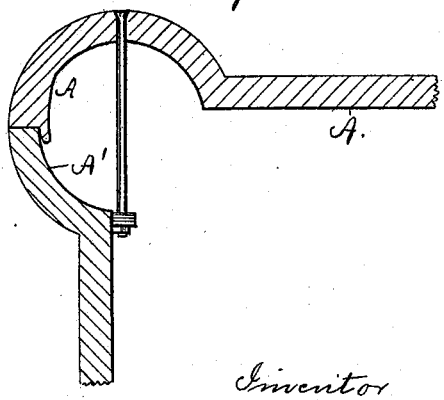
Witnesses
Ray Hutchins.
P. A. Malberg
Inventor
William N. Moore By
Thos. H. Hutchins his atty

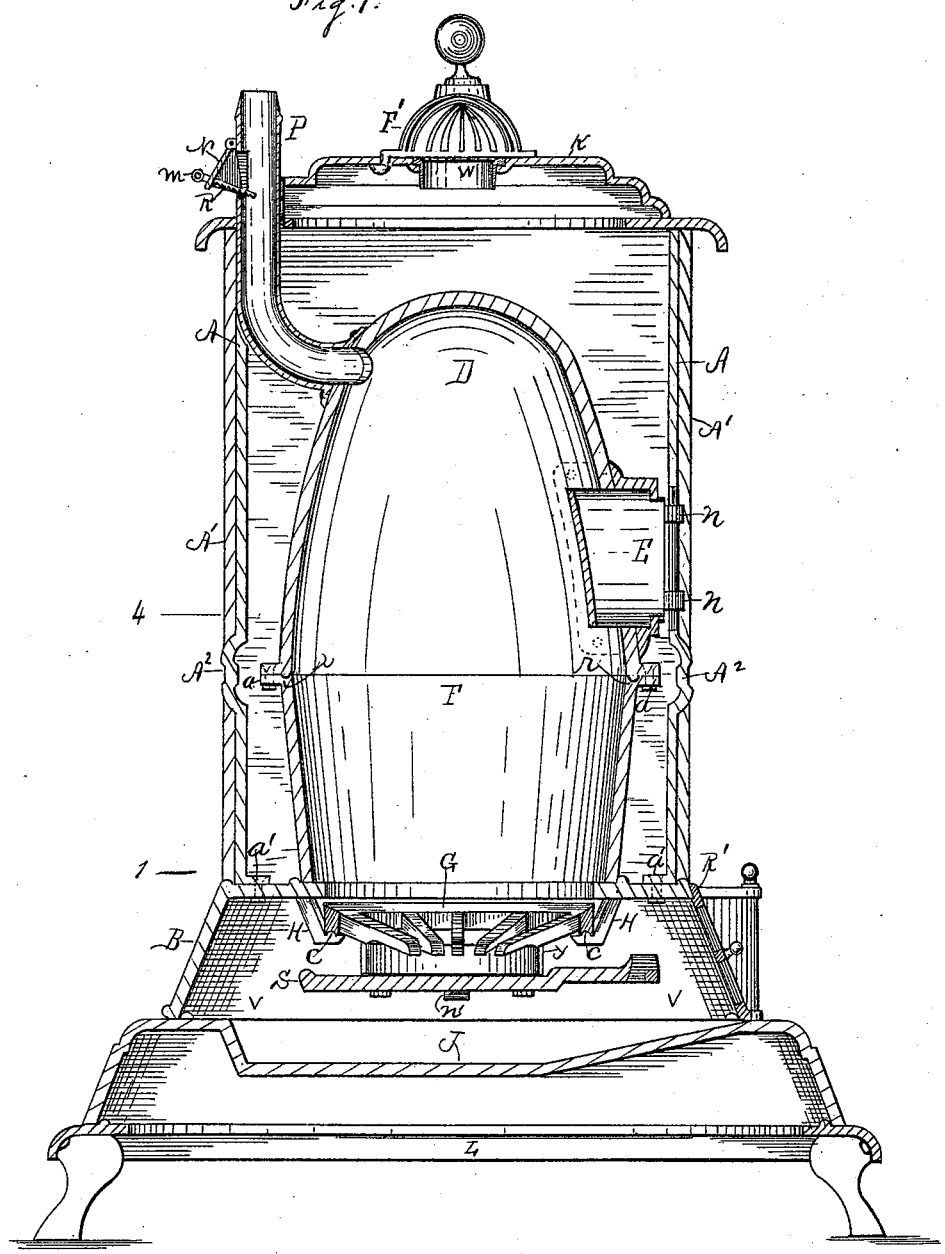

UNITED STATES PATENT OFFICE.

WILLIAM N. MOORE, OF JOLIET, ILLINOIS.

HEATING-STOVE.

SPECIFICATION forming part of Letters Patent No. 499,306, dated June 13, 1893.

Application filed July 9, 1892. Serial No. 439,490. (No model.)

*To all whom it may concern:*

Be it known that I, WILLIAM N. MOORE, a citizen of the United States of America, residing at Joliet, in the county of Will and State of Illinois, have invented certain new and useful Improvements in Heating-Stoves, of which the following is a specification, reference being had therein to the accompanying drawings and the letters of reference thereon, forming a part of this specification, in which—

Figure 1 is a vertical central section taken on line 2 of Fig. 2. Fig. 2 is a horizontal section taken on line 1 of Fig. 1 looking down. Fig. 3 is a central vertical section taken on line 3 of Fig. 2 showing only the lower portion of the fire pot and outer case and the base plates. Fig. 4 is a vertical section through the feed door and its frame, and showing a section of the outer case and of the dome over the fire pot. Fig. 5 is a horizontal section of the outer case taken on line 4 of Fig. 1 looking down. Fig. 6 is a plan of the reversible roller ring in the upper part of the outer case, and Fig. 7 is a detail of one of the corners of the outer case showing the manner in which the corners of the outer case are joined together.

This invention relates to certain improvements in heating stoves, which improvements are fully set forth and explained in the following specification and claims.

Referring to the drawings B is the base of the stove supporting the fire pot F, grate G, and the outer case A which is attached to said base plate by means of the bolts as shown at $a'$ in Fig. 1, and has secured to its top, the top plate K provided with the swinging cover F' for covering a griddle hole in said plate.

D is a parabola shaped dome resting on the upper end of the fire pot F, and bolted thereto at $a$ as shown. The fire pot F is provided on its upper extremity with a cup shaped annular channel $r$ for receiving a corresponding annular rib on the lower extremity of the dome, the two forming a joint from which the putty or cement with which such joints are usually made is prevented from falling out. The base plate J is provided with the cold air passage $x$, $x$, opening into the chambers $w'$ $w'$ formed of said base plate, the side and top walls of base plate B and the partitions $v$, $v$, arranged one at each side of a central ash pit.

The base plate B is provided with cold air passages $z$ for permitting an ascending current of cold air to pass up between the fire pot and dome, and the outer case so it may be heated and discharged from between the dome and fire pot and said outer case and its top K. It is intended that said outer case and its top shall be perforated or made of ornamental scroll work so that the heated air may pass through it out into a room. The ornamental scroll work is not shown as it is deemed to be unnecessary.

The grate G rests and rotates on hooks H integral with the under part of base plate B, said hooks being provided on their upper side with a segment of an annular rib $c$ for fitting a corresponding annular groove in the under side of the grate for the purpose of preventing lateral movement of the grate as much as possible.

$y$ is a downwardly extending annular flange integral with the grate, and S is a sliding grated bottom resting on hooks $n'$ integral with said flange. The grate G may be rotated and the grated bottom S may be rotated and reciprocated by the introduction of an ordinary shaker through an aperture in the ash pit door R'.

The dome D is provided with a feed door opening inclosed by a door frame E bolted to the dome and provided with hinge lugs for attaching the feed door L' thereto, so that said door and its frame are entirely disconnected and independent from the outer case A and not in contact with it, the case A simply having a door opening that fits closely around the edge of said door frame to make an apparent joint therewith, but not in contact therewith.

P is a flue pipe leading upward from the dome D and passes out through an opening in said outer case A and its top K, but not in contact therewith and not secured in any way thereto, so that said dome and flue, and the fire pot rest on base B entirely disconnected and free from any other part of the stove, so that the swelling or expanding and shrinking of the fire pot and dome in no way affect the other parts of the stove. This is deemed to be one of the new features of the stove. The outer case A consists of four walls and a top being bolted together at their points as shown in Fig. 7, and to the base B as shown in Fig. 1, and to the top K the same as is usual in any stove construction. The outside ornamental walls of case A are constructed at their meeting edges so that when joined they form a circular molding as shown at A' in Figs. 1 and 7 and are bolted together at about their center as shown in Fig. 7, the object being that each wall shall have the additional strength and stiffness afforded by such form to prevent warping of the side walls of the case from a perpendicular line. The said side walls of the case are also provided at about their center with the horizontal integral ribs or moldings A² for giving strength to the walls of the case and preventing their warping and for giving room for the joining flanges of the fire pot and dome so that the outer case A may stand very near them and not be in contact therewith.

The flue P is provided with a check draft door N hinged thereto at its upper end and is provided at each end with the wings R that extend into the flue so as to prevent draft into the flue at the ends of the check draft door, and is also provided with a ratchet arm M for holding the door N open any desired distance, or permitting it to be closed when desired. The use of said side wings R is to prevent cross currents of air from entering the flue, and causing the air that enters, to enter as an ascending current and not interfere with the draft up the flue from the fire pot. The top of the case A is provided in its top plate K with an annular ring W set in an annular seat so that in ordinary use the ring W is flush with the top and permits the hinged cover F' to pass over it. Said ring is also provided on its under side with a projecting annular flange as shown in Fig. 1, which when the ring is inverted in its seat becomes a collar to which a pipe may be attached for conducting heated air to an upper room. Said ring is also provided with small cross bars $d$ shown in Fig. 6, which permit the free passage of heated air, but which afford a support for dishes or vessels containing water or other substances that it may be desired to heat; it being understood that this construction does not provide for the heating of upper rooms and the heating of water at the same time.

Having thus described my invention, what I claim as new, and desire to secure by Letters Patent, is as follows, to wit:

1. A heating stove comprising the following elements viz. a base having the cold air chambers $w'$ extending entirely across from side to side, and having apertures for admitting cold air to, and discharging it from said chambers, a fire pot resting on said base plate, a parabola shaped dome resting on and secured to the fire pot, a feed door and its frame and a flue secured to said dome, and an outer case resting on and secured to the stove base for forming a chamber between it and the fire-pot and dome. and connected with chambers $w'$ by means of air passages $z$, all combined and arranged to operate substantially as and for the purpose set forth.

2. In a heating stove the combination of the firepot and dome the base plate for supporting said firepot and the outer case A having the strengthening corner moldings or ribs A' and the cross moldings or strengthening ribs A² substantially as and for the purpose set forth.

WILLIAM N. MOORE.

Witnesses:
 THOS. H. HUTCHINS,
 RAY HUTCHINS.